Aug. 6, 1935.　　　　A. D. ROBBINS　　　　2,010,161

MULTISPEED TRANSMISSION

Filed July 26, 1933　　　7 Sheets-Sheet 1

INVENTOR
Azor D. Robbins,
BY
Redding, Greeley, O'Shea & Campbell
HIS ATTORNEYS

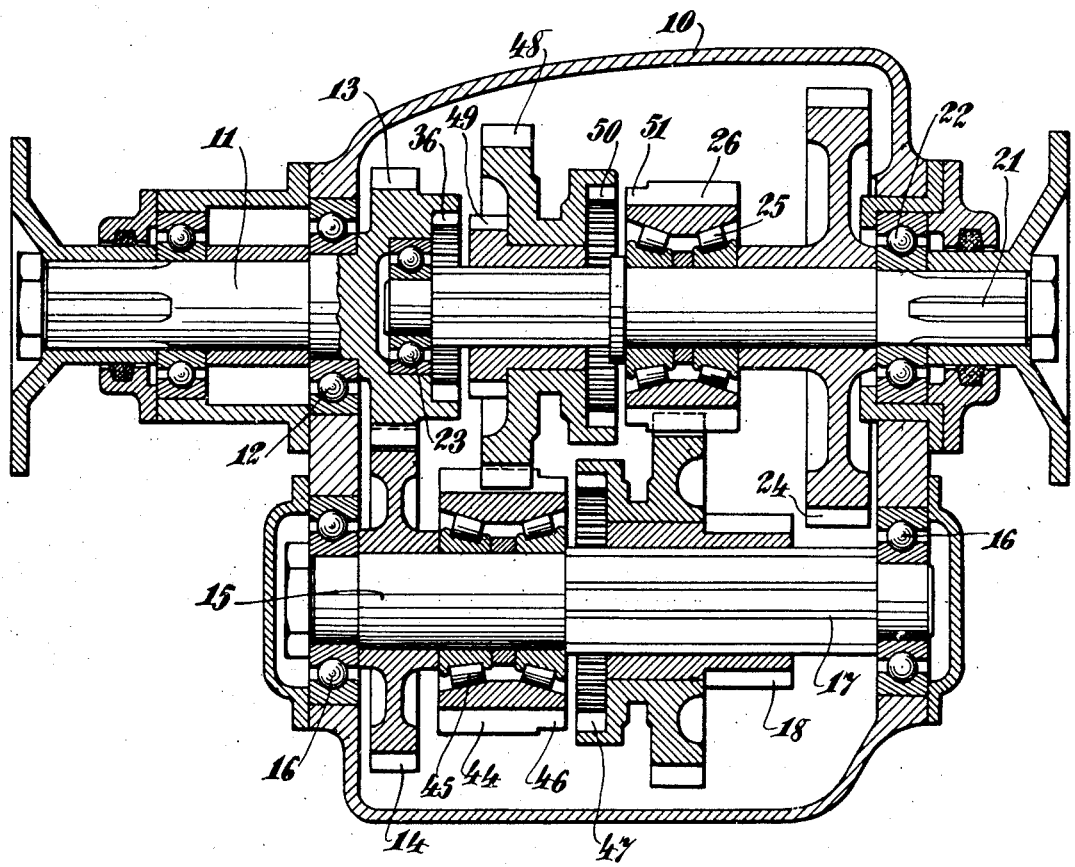

Aug. 6, 1935. A. D. ROBBINS 2,010,161
MULTISPEED TRANSMISSION
Filed July 26, 1933 7 Sheets-Sheet 3
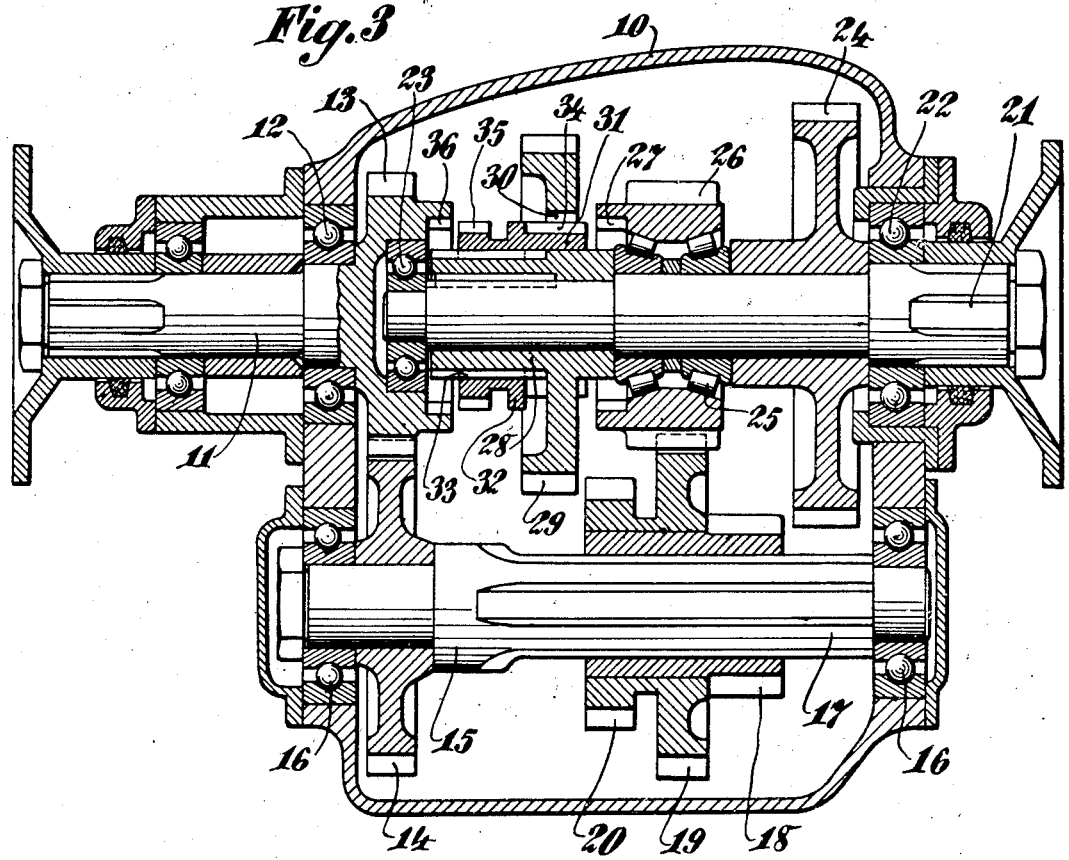
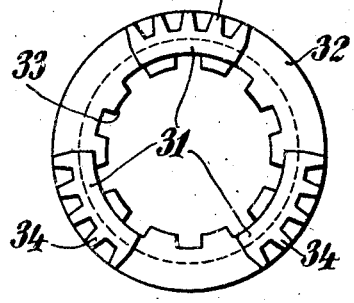
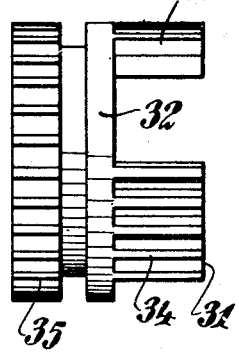
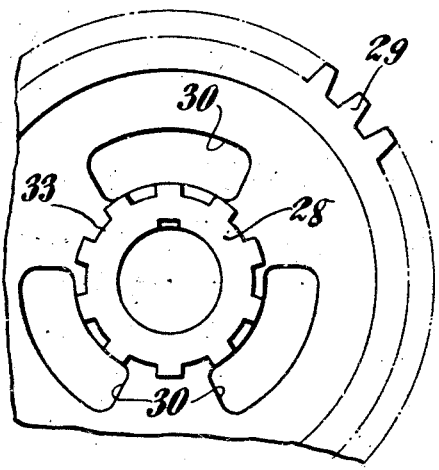
INVENTOR
*Azor D. Robbins,*
BY
Redding, Greeley, O'Shea & Campbell
HIS ATTORNEYS

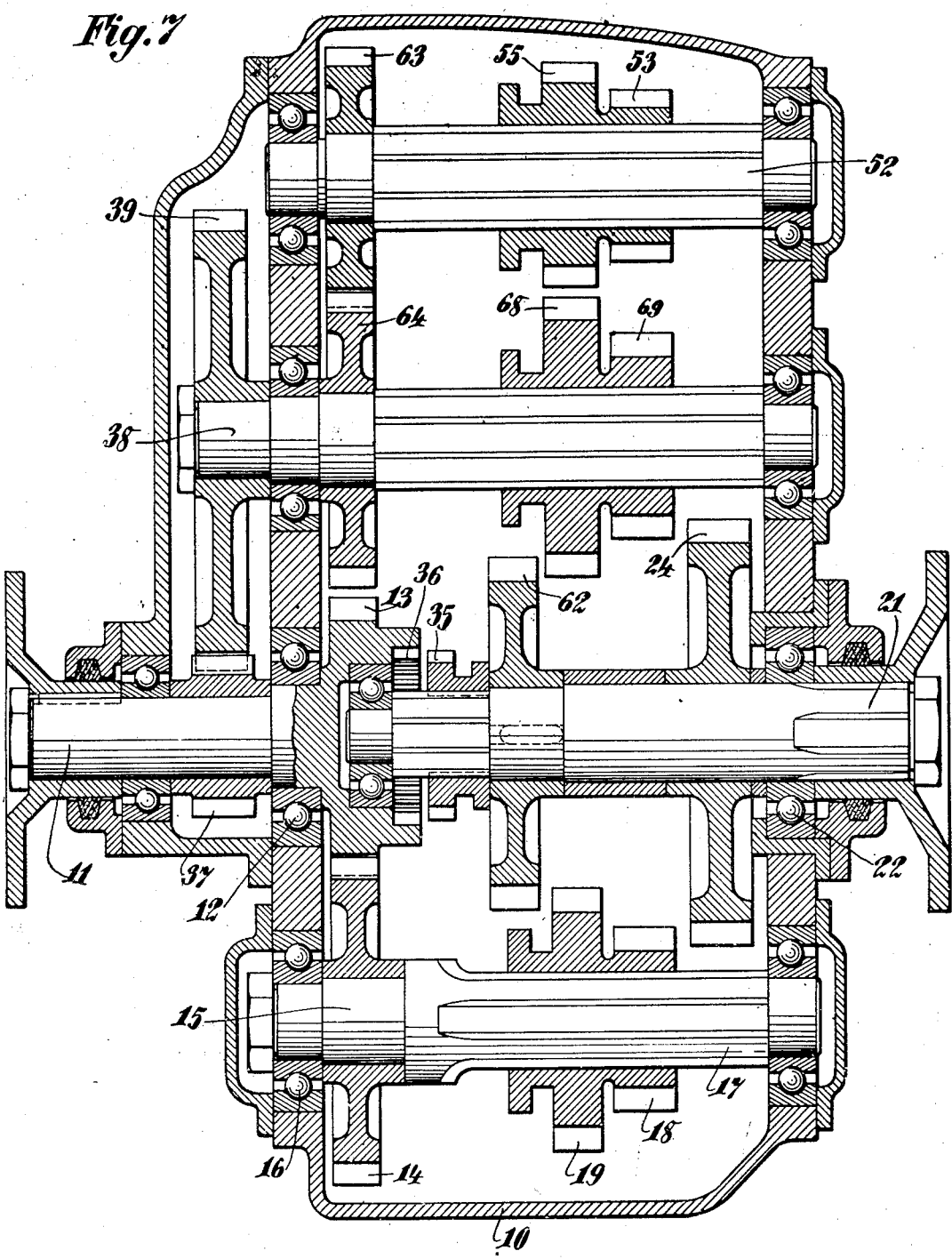

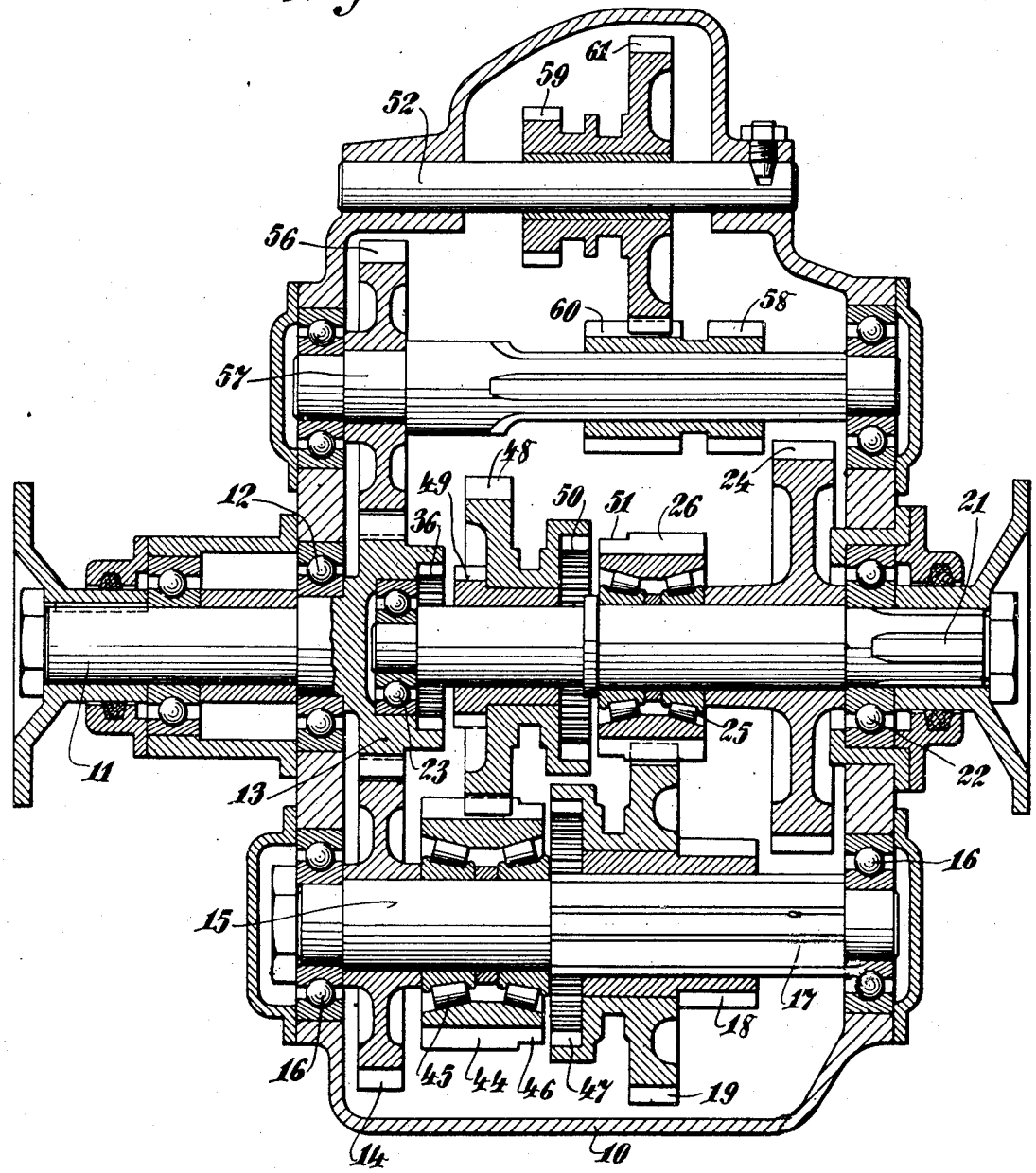

INVENTOR
*Azor D. Robbins,*
BY
*HIS* ATTORNEYS

Patented Aug. 6, 1935

2,010,161

UNITED STATES PATENT OFFICE 2,010,161

MULTISPEED TRANSMISSION

Azor D. Robbins, Highland Park, N. J., assignor to International Motor Company, New York, N. Y., a corporation of Delaware Application July 26, 1933, Serial No. 682,241

11 Claims. (Cl. 74—333)

The present invention relates to transmissions for motor vehicles and embodies, more specifically, an improved transmission construction by means of which a predetermined desired number of speed changes may be effected with greater simplicity and interchangeability of parts than possible with speed change mechanisms now available.

One common way in which more than three speeds are afforded in vehicle transmissions is to provide an auxiliary transmission which not only increases the length of the driving units but also necessitates additional supporting mechanism on the frame.

To avoid the necessity of using auxiliary transmissions and thus save the room required thereby, as well as the additional supporting structure therefor, the present invention has been designed and an object of the invention is to provide an improved multi-speed transmission, the parts of which are simple of construction and of such nature that certain of the parts may be readily interchanged, thus facilitating standardization of the mechanism.

A further object of the invention is to provide a device of the character above referred to wherein the overall length of the transmission mechanism is shortened substantially over existing designs.

A further object of the invention is to provide a transmission mechanism of the above character which utilizes relatively short and rigid shafts upon which the transmission gears are supported, the mechanism being light in weight and shifted with great facility.

A further object of the invention is to provide a multi-speed transmission construction of the above character wherein only one lever is utilized to effect the gear changes instead of two levers as now commonly used.

Further objects of the invention will appear hereinafter as it is described in greater detail in connection with the accompanying drawings, wherein—

Figure 2 is a view similar to Figure 1, showing a modified form of the invention.

Figure 3 is a view similar to Figure 1, showing a further modification of the invention.

Figure 4 is a detail view in elevation, showing one of the gears of the transmission which is mounted upon the driven shaft of Fig. 3.

Figure 5 is a detail view in elevation, showing the sliding clutch utilized in the mechanism shown in Figure 3.

Figure 6 is a view in side elevation showing the clutch of Fig. 5.

Figure 7 is a view also similar to Fig. 1, showing a further modification of the invention.

Figure 8 is a view similar to Figure 1, showing a further modification of the invention.

Figure 1:
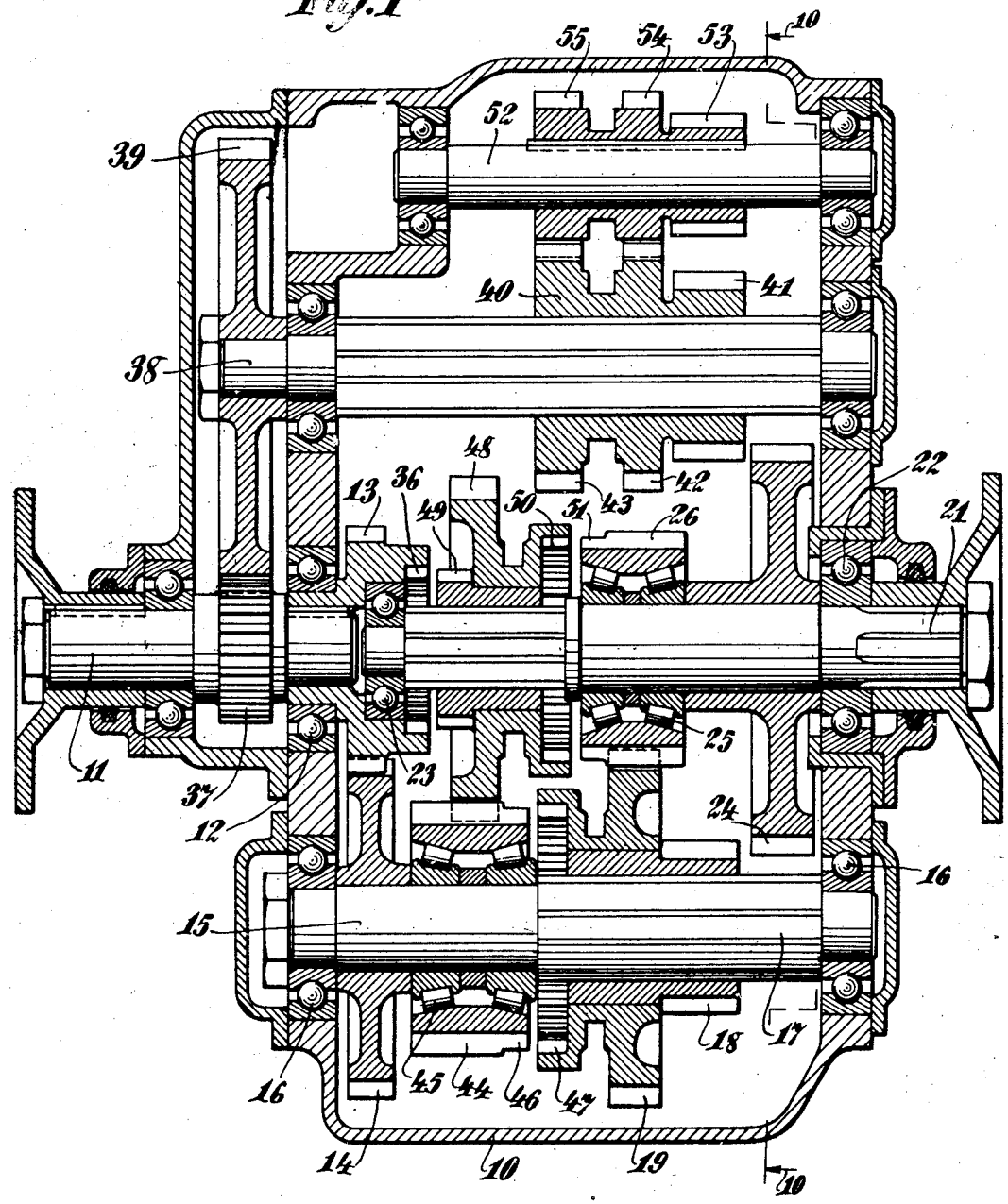
Figure 1 is a view in section taken through a transmission constructed in accordance with the present invention and showing the gears by means of which the speed change is effected.

Figure 1 illustrates the preferred form of the invention, wherein the drive shaft 11 is provided with a gear 37 in addition to a gear 13. In addition to the countershaft 15, a countershaft 38 is provided upon which a gear 39 is secured. Gear 39 is in constant mesh with gear 37, and thus countershafts 38 and 15 are constantly rotated by the driving shaft. A gear cluster 40 is splined to the countershaft 38 and includes gears 41, 42 and 43.

Countershaft 15 is provided with a gear 44, which is journaled thereon at 45 and is provided with clutch teeth 46 to engage clutch teeth 47 upon gear 19. A gear 48 is splined to the driven shaft 21 and is provided with clutch teeth 49 which are adapted to engage the clutch teeth 36 upon the driving gear 13. Gear 48 is also provided with internal clutch teeth 50 which are adapted to engage external clutch teeth 51 formed upon the gear 26.

A reverse countershaft 52 is journaled in the transmission and is provided with a gear cluster including gears 53, 54 and 55.

The transmission speeds afforded by the construction shown in Figure 1 are as follows. The lowest speed of the transmission is afforded when gear 41 engages gear 24 to drive the driven shaft 21 from the constantly driven countershaft 38. The second speed is afforded when gear 43 engages gear 48. When gear 18 engages gear 24, the third transmission speed is provided, and a fourth speed is obtained by moving the clutch 47 into engagement with clutch teeth 46, thus driving the constant mesh gears 44 and 48 from the countershaft 15. A direct drive or fifth speed is afforded when clutch teeth 49 and 36 are in engagement, and a sixth speed or over-drive is afforded when clutch teeth 50 and 51 are in engagement transmitting the drive from the constantly running countershaft 15 to gear 26 on the driven shaft.

The reverse speeds obtainable by the construction shown in Figure 1 are as follows. Sliding the gear cluster including gears 53, 54 and 55 to the right, as viewed in the drawings, brings gear 53 into engagement with gear 24 thereby obtaining a low reverse speed. In this position the gears 42 and 55 are in engagement and the drive is taken from the countershaft 38 through gears 42 and 55, gears 53 and 24 to the driven shaft. Sliding the gears on the reverse countershaft in the opposite direction, affords a high speed reverse by engaging gear 55 with gear 48. In this position the gears 48 and 55 receive the drive from countershaft 38 through gears 43 and 54.

In the construction shown in Figure 2, a modification of the construction shown in Figure 1 is embodied. In this construction three of the speeds are obtained by clutch engagements, these speeds being the ones most used. The low speed is obtained by engaging gears 18 and 24, as in the construction shown in Figure 1. The second speed is obtained by engaging clutch teeth 46 and 47 to drive the driven shaft 21 through gears 44 and 48. Direct drive is obtained by engaging clutch teeth 36 and 49, and the overspeed or fourth change is secured by engaging clutch teeth 50 and 51.

With reference to Figures 3, 4, 5 and 6, a transmission housing is shown at 10 and has a driving shaft 11 journaled therein by means of bearings 12. Secured to the driving shaft 11 is a driving gear 13, which is in constant mesh with a gear 14 secured to countershaft 15. Countershaft 15 is journaled in the housing 10 by means of bearings 16 and is splined at 17 to slidably mount a gear cluster consisting of gears 18, 19 and 20.

Coaxially with the driving shaft 11 is a driven shaft 21, which is journaled at 22 in the housing 10. The driven shaft 21 is journaled at 23 within the gear 13 and has secured thereto a gear 24 which is adapted to be engaged by gear 18 on the countershaft 15. Journaled upon the driven shaft 21 by means of bearings 25 is a gear 26, which is adapted to be engaged by the gear 19 and is provided with internal clutch teeth 27.

Upon the end of the driven shaft 21 adjacent bearing 23 is secured a sleeve 28 upon which a gear 29 is formed. Gear 29 is adapted to be engaged by the gear 20 and is formed with apertures 30 through which the clutch arms 31 are adapted to move. The clutch arms 31 are formed upon a sleeve 32 which is splined at 33 to the sleeve 28, and are formed with external clutch teeth 34, which are adapted to engage the internal teeth 27. The sleeve 32 is further provided with external clutch teeth 35 which are adapted to engage internal clutch teeth 36 formed upon the gear 13.

The foregoing mechanism functions as follows to afford four forward speeds. The first or low speed is obtained by engaging gear 18 with gear 24, thus transmitting the drive from the driving shaft 11 through gears 13 and 14, gears 18 and 24, to the driven shaft 21. Second or intermediate speed is provided by engaging gear 20 with gear 29 and direct drive is secured by engaging clutch teeth 35 with clutch teeth 36. A fourth or over-speed is secured by engaging clutch teeth 34 with clutch teeth 27, thus transmitting the drive from countershaft 15 through gears 19 and 26, to the driven shaft 21.

It will be noted that the foregoing construction, as well as the remainder of the constructions described herein, utilizes at least two gears upon the driven shaft of the transmission mechanism.

In the construction shown in Figure 7, a five-speed transmission is illustrated in which the driven shaft 21 is provided with spaced gears 24 and 62. Countershaft 15 is driven from the driving shaft 11 in the manner described in connection with the construction shown in Figure 5. Clutch teeth 35 and 36 serve to provide a direct connection between the driving and driven shafts. Countershaft 38 is driven from the driving shaft 11 by means of gears 37 and 39, in similar fashion to the construction shown in Figure 1. The reverse countershaft 52 is provided with a gear cluster and is driven by means of a gear 63 from a gear 64 upon countershaft 38.

Figure 8 shows a construction wherein a five-speed transmission with one reverse speed is provided, only one main drive pinion being utilized. The drive pinion is shown at 13 and corresponds to the same element described in connection with the previous modifications. In constant mesh with this pinion are gears 14 and 56 upon countershafts 15 and 57 respectively. Countershaft 15 and driven shaft 21 are provided with the same elements as in the construction shown in Figure 1, and countershaft 57 is provided with a gear cluster including a gear 58 which is adapted to engage with gear 24 to provide the low or first speed of the transmission. The reverse countershaft 52 is provided with a gear cluster including a gear 59 which is adapted to be moved into engagement with gear 48. In constant mesh are gears 60 and 61 upon countershafts 57 and 52 respectively.

Figure 9:
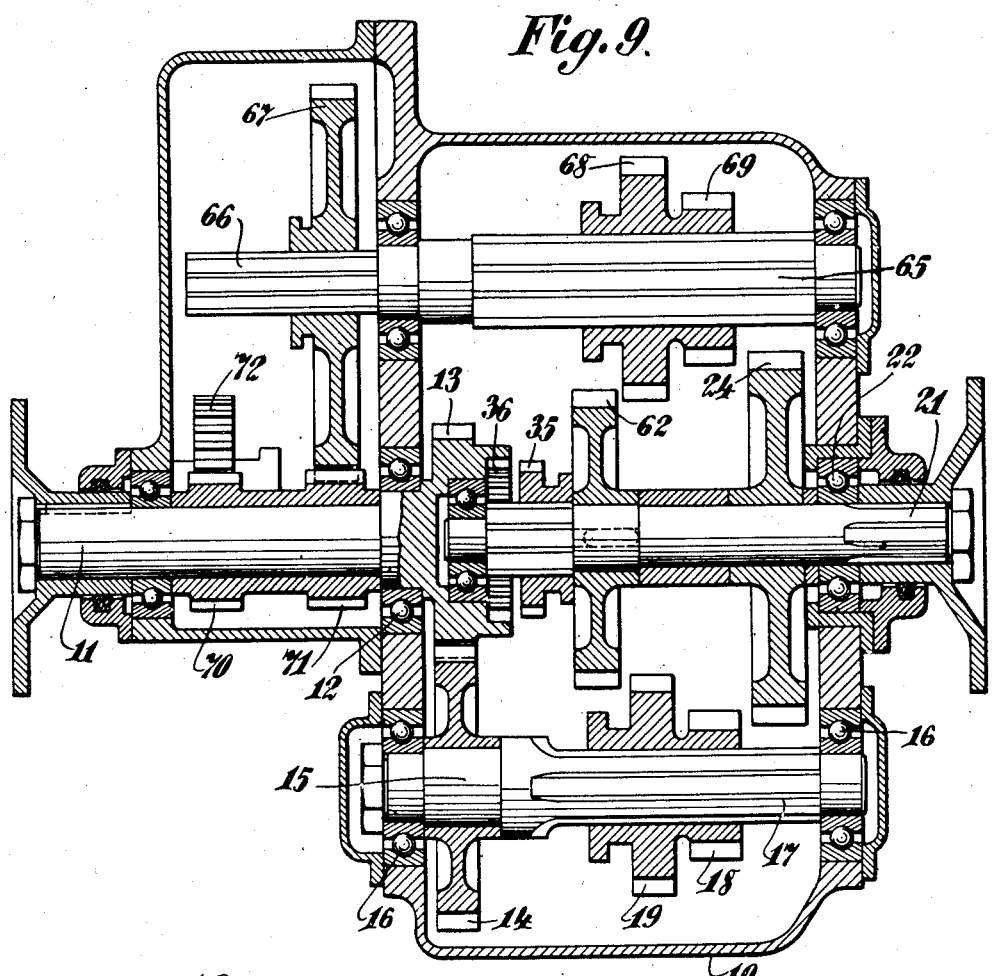
Figure 9 is a sectional view, showing another form of transmission mechanism in which the invention may be incorporated.
Figure 10:
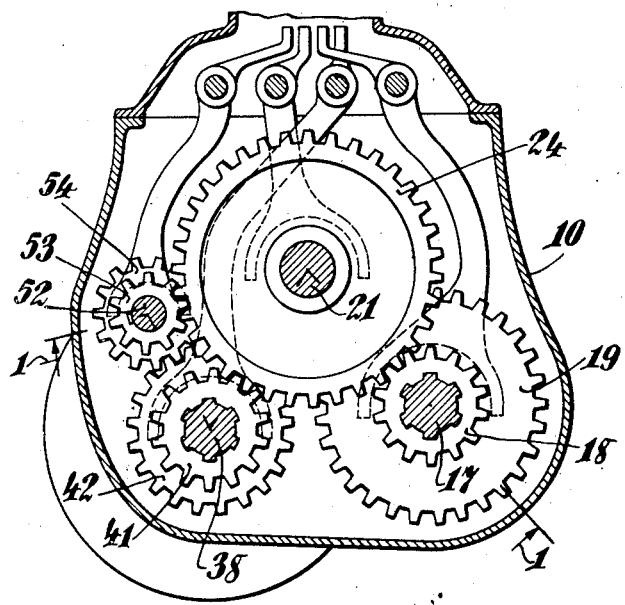
Figure 10 is a view in section, taken on the line 10—10 of Figure 1, and looking in the direction of the arrows.

The construction shown in Figure 9 illustrates a form of the invention wherein one of the countershafts is utilized in connection with both forward and reverse drives. The driven shaft 21 is similar in construction to the corresponding element in Figure 7 and countershaft 15 and clutch elements 35 and 36 are likewise similar to the corresponding elements of Figure 7. Countershaft 65, however, is provided with a splined extension 66 upon which a gear 67 is slidable. Gear cluster comprising gears 68 and 69 is slidably mounted upon the countershaft 65 and adapted to engage gears 24 and 62 upon the driven shaft. The driving shaft 11 is provided with spaced gears 70 and 71. An idler gear 72 is engaged by the driving gear 70 and gear 67 is adapted to engage either gear 71 or idler gear 72. In this fashion the direction of rotation of the countershaft 65 may be reversed and the gear connections afforded by the gears thereon thus utilized in either forward or reverse driving connections.

Figure 11:
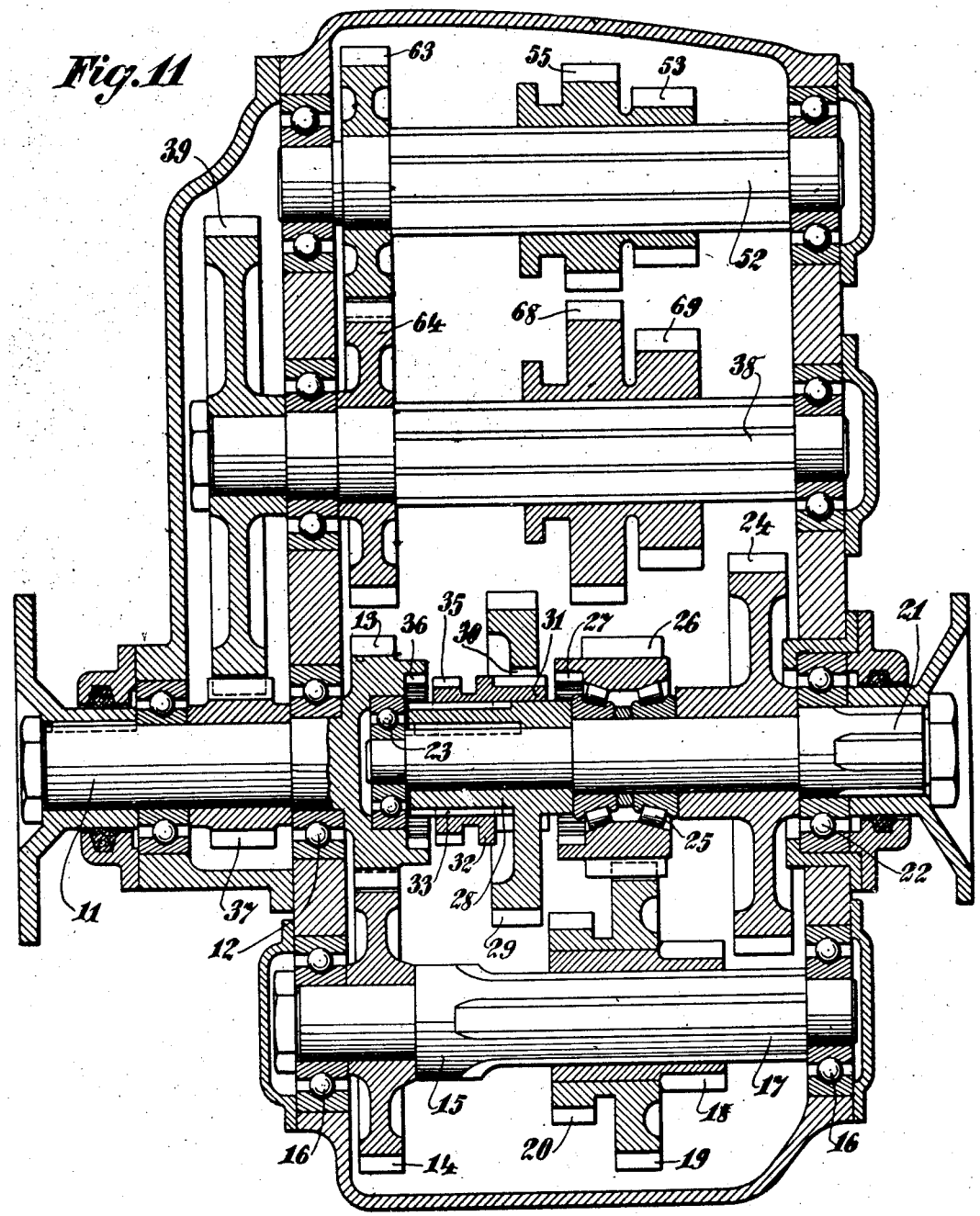
Figure 11 is a view in section showing a form of the invention utilizing the clutch features of Figure 3 with the countershaft features of Figure 7.

The construction shown in Figure 11 illustrates a further form of the invention wherein the sliding clutch construction of Figure 3 has been embodied in the transmission of Figure 7. The reference characters used for this construction are the same as those used for the corresponding elements of Figures 3 and 7 and a detailed description of this figure is, therefore, believed unnecessary.

While the invention has been described specifically in connection with the drawings above referred to, it is not to be limited save as defined by the appended claims.

I claim as my invention:
1. A transmission having a driving and a coaxial driven shaft, a countershaft driven by the driving shaft, a gear fixedly secured to the driven shaft, a gear journaled on the driven shaft, a gear shiftable on the driven shaft, a gear journaled on the countershaft and constantly engaging the shiftable gear on the driven shaft, a gear shiftable on the countershaft and adapted to engage the fixed gear on the driven shaft, a second gear shiftable on the countershaft and constantly engaging the gear journaled on the driven shaft, means adapted to clutch the journaled gears to their respective shafts and a clutch adapted to engage the driving and driven shafts.

2. A transmission having a driving and a coaxial driven shaft, a countershaft driven by the driving shaft, a gear journaled on the driven shaft, a gear shiftable on the driven shaft, a gear journaled on the countershaft and constantly engaging the shiftable gear on the driven shaft, a gear shiftable on the countershaft and constantly engaging the gear journaled on the driven shaft, a clutch carried by the shiftable gear on the countershaft and adapted to engage the gear journaled on the countershaft, a clutch carried by the shiftable gear on the driven shaft and adapted to engage the gear journaled on the driven shaft, a second clutch carried by said shiftable gear on the driven shaft and adapted to engage the driving shaft.

3. A transmission having a driving and a coaxial driven shaft, a countershaft driven by the driving shaft, a gear fixedly secured to the driven shaft, a gear journaled on the countershaft, a gear slidable on the countershaft and adapted to engage the fixed gear on the driven shaft, said slidable gear having a clutch adapted to engage the gear journaled on the countershaft, a gear slidable on the driven shaft and constantly in mesh with the gear journaled on the countershaft, said slidable gear on the driven shaft having a clutch adapted to engage the driving shaft.

4. A transmission having a driving and a coaxial driven shaft, a gear fixedly secured to the driven shaft, a gear slidable on the driven shaft and having a clutch to directly connect the driving and driven shafts, a plurality of countershafts driven from the driving shaft, said countershafts having the same direction of rotation, a third countershaft, and means to effect a geared connection of the driving shaft therewith, said third shaft rotating in the opposite direction to the other countershafts, and means on each of said countershafts to effect driving engagement with the gears on the driven shaft selectively.

5. A transmission having a driving and a coaxial driven shaft, a gear fixedly secured to the driven shaft, a gear slidable on the driven shaft and having a clutch to directly connect the driving and driven shaft, a countershaft driven from the driving shaft by a pair of gears, a second countershaft driven from the driving shaft by a second pair of gears, a third countershaft driven from the second countershaft and rotating in the opposite direction to the first named countershafts, and means on all countershafts to effect a driving engagement with the gears on the driven shaft selectively.

6. A transmission having a driving and a coaxial driven shaft, a gear fixedly secured to the driven shaft, a gear slidable on the driven shaft and having a clutch to directly connect the driving and driven shaft, a countershaft driven from the driving shaft by a pair of gears, a second countershaft driven by a second pair of driving gears, a third countershaft driven from the second countershaft and rotating in the opposite direction to the first named countershafts, means on all countershafts to effect a driving engagement with the gears on the driven shaft selectively, and means on the second and third countershafts to provide a drive for the third countershaft.

7. A transmission having a driving and a coaxial driven shaft, a gear fixedly secured to the driven shaft, a gear journaled on the driven shaft, a gear slidable on the driven shaft and having a clutch to directly connect the driving and driven shaft, said sliding gear having another clutch to connect the journaled gear to the driven shaft, a countershaft driven from the driving shaft, a gear journaled on the countershaft and engaging the sliding gear on the driven shaft, a gear cluster slidable on the countershaft and comprising a gear adapted to selectively engage the gear secured to the driven shaft and a gear constantly engaging the gear journaled on the driven shaft, said cluster having a clutch adapted to engage the gear journaled on the countershaft, a second countershaft driven by the driving shaft, gears slidable on the second countershaft and adapted to engage the fixed and sliding gears on the driven shaft selectively, a third countershaft having slidable gears, and means to drive the third countershaft by the second countershaft, the slidable gears on said third countershaft being adapted to engage the fixed and sliding gears on the driven shaft selectively.

8. A transmission having a driving and a coaxial driven shaft, a plurality of gears fixedly secured to the driven shaft, a countershaft driven from the driving shaft by a pair of gears, a second countershaft driven from the countershaft by a second pair of gears, a plurality of sliding gears on each countershaft, and means to engage each of the gears on the driven shaft by a gear on each countershaft.

9. A transmission having a driving and a coaxial driven shaft, means to connect the said shafts directly, a counter shaft driven continuously by the driving shaft, at least one of the two last named shafts having a gear journaled thereon, additional gears on the said one shaft, a gear slidable on the other of the two last named shafts engaging the journaled gear, and means movable with the sliding gear and cooperating with the said additional gears for effecting a plurality of speed change connections.

10. A transmission having a driving and a coaxial driven shaft, a gear fixedly secured to the driven shaft, a gear slidable but non-rotatably mounted on the driven shaft, a countershaft driven from the driving shaft, means slidable but non-rotatably mounted on the countershaft to effect engagement of the gears on the driven shaft to be driven by the countershaft selectively, a second countershaft driven from the driving shaft and rotating in the same direction as the first named countershaft, gears slidable but non-rotatably mounted on the second countershaft and provided with means to effect a driving engagement with the gears on the driven shaft, the sliding gear on the driven shaft having a clutch to connect the driving shaft directly to the driven shaft.

11. A transmission having a driving and a coaxial driven shaft, a gear fixedly secured to the driven shaft, a gear slidable but non-rotatably mounted on the driven shaft and having a clutch to directly connect the driving and driven shafts, a countershaft driven from the driving shaft, means slidable but non-rotatably mounted on the countershaft to effect engagement of the gears on the driven shaft to be driven by the countershaft selectively, a second countershaft driven from the driving shaft and rotating in the same direction as the first named countershaft, gears slidable but non-rotatably mounted on the second countershaft and provided with means to effect a driving engagement with the gears on the driven shaft, a third countershaft driven by the second countershaft, and gears slidable on the third countershaft to engage the gears on the driven shaft selectively.

AZOR D. ROBBINS.